United States Patent [19]
Foladare et al.

[11] Patent Number: 5,914,472
[45] Date of Patent: Jun. 22, 1999

[54] CREDIT CARD SPENDING AUTHORIZATION CONTROL SYSTEM

[75] Inventors: Mark Jeffrey Foladare, Kendall Park; Shelley B. Goldman, East Brunswick; Dominick Gorini, Long Valley; David Phillip Silverman, Somerville; Shaoqing Wang; Robert S. Westrich, both of Middletown, all of N.J.

[73] Assignee: AT&T Corp, Middletown, N.J.

[21] Appl. No.: 08/936,002

[22] Filed: Sep. 23, 1997

[51] Int. Cl.⁶ .................................................. H04M 11/00
[52] U.S. Cl. ........................... 235/380; 235/382.5; 705/35
[58] Field of Search ..................................... 235/379, 380, 235/382, 382.5; 340/825.33; 705/35, 44

[56] References Cited

U.S. PATENT DOCUMENTS

| | | | |
|---|---|---|---|
| 5,046,157 | 9/1991 | Smith et al. | 235/382.5 |
| 5,350,906 | 9/1994 | Brody et al. | 235/380 |
| 5,513,250 | 4/1996 | McAllister | 379/91 |
| 5,621,201 | 4/1997 | Langhans et al. | 235/380 |
| 5,708,422 | 1/1998 | Blonder et al. | 340/825.33 |
| 5,770,843 | 6/1998 | Rose et al. | 235/380 |

*Primary Examiner*—David P. Porta
*Assistant Examiner*—Drew A. Dunn

[57] ABSTRACT

A system and method for allowing a parent to control the use of an ancillary credit or debit transaction card which is issued to a child. A central computer communicates with an issuer computer having a data base containing account information and spending limits for the transaction card and the parent can set a spending limit for the ancillary card given to the child. When the child presents the ancillary transaction card to a merchant in payment of merchandise, the merchant swipes the card and contacts a central computer for card authorization. If the credit limit of the ancillary card holder has been exceeded according to the data base, a method of contacting the parent is transmitted to the central computer. The central computer initiates contact with the parent via two-way communications, for example, two way pager, cellular telephone, or other personal communication service, and queries the parent whether to authorize the transaction by increasing the spending limit of the ancillary cardholder or refusal of the transaction. The parent responds to the central computer via the two-way communications device, and the central computer forwards an approval/refusal code to the merchant. In this manner, a parent can control the maximum transaction card spending by a child.

21 Claims, 3 Drawing Sheets

CREDIT CARD SPENDING AUTHORIZATION CONTROL SYSTEM

BACKGROUND OF THE INVENTION

1. Field of Invention

Technical Field. The present invention relates to a system for authorizing monetary transactions for the procurement of goods, services or distribution of currency using a credit or debit transaction card, and more particularly for parental control of spending by a child where a parent is contacted by two-way communications to authorize spending amounts exceeding a predetermined spending limit.

2. Description of Related Art

Background. There presently exists a number of credit or debit transaction card networks issuing particular types of transaction cards to their customers. For example, credit cards such as Visa or Mastercard are well known. In order to authorize a transaction, a merchant will typically contact the issuer of the card in order to receive authorization to apply the cost of the transaction to the customer's account with the issuer.

When a holder of a credit or debit transaction card presents the card to a merchant in order to purchase goods, services or distribution of currency, some form of authorization by the card issuer is typically sought by the merchant to minimize theft and risk of loss to the merchant. One early method of transaction card authorization consisted of the merchant consulting a list of account numbers published by the card issuer or other transaction card institution, e.g., Visa or Mastercard, and the merchant would check the presented card against the numbers on the list. If the account number of the transaction card appeared on the list, the merchant could deny/refuse the transaction or telephone the appropriate card issuer for further information or instructions.

More recently, electronic transaction card authorization networks have been developed. In these networks, the merchant uses a terminal which can read account information encoded on a magnetic strip located on the back of the transaction card. The terminal then automatically calls a central processor, operated by the network which will analyze the authorization request. The call from the terminal is typically routed through a local financial institution or transaction card issuer.

The central processor, upon receipt of the call from the merchant, initiates an electronic data link to the processor operated by the transaction card issuer to determine if the transaction should be approved or refused. The processor at the transaction card issuer may check the status of the account within its database, and generates a response. This response is then routed back to the merchant's terminal, typically in the form of an approval code or refusal code.

Many transaction card issuers issue additional, or ancillary, cards under an account holder's account for use by persons, other than the customer, authorized by the customer. For example, an ancillary transaction card may be issued to a spouse, child, or other dependent relative. When a merchant seeks approval of a presented transaction card, the information accessed by the authorization networks is generally limited to the card customer's account information. Spending limits on the ancillary cards from the account holder's account may or may not be lower than the customer's maximum limits.

An ancillary cardholder may have a predetermined spending limit lower than the maximum authorized for the account holder. When an ancillary cardholder presents the transaction card to a merchant for procurement of goods, services or distribution of currency, if the predetermined account limit is exceeded, a refusal code will be supplied by the central processor to the merchant. Only the account holder may authorize an increased spending limit for an ancillary card. Such approval for increased spending limits for ancillary cards is typically performed by sending a letter to the card issuer or via telephone call from the account holder to the card issuer where security identification and authentication steps must be followed. In this manner, an ancillary cardholder cannot receive authorization to complete the procurement of goods, services or distribution of currency in a timely manner.

SUMMARY OF THE INVENTION

In view of the aforesaid problems of authorizing increased spending limits for transaction cards held by ancillary users, an object of the present invention is to provide a system for controlling the spending limits of an ancillary cardholder whereby communication is established with the account holder when the ancillary cardholder has exceeded a predetermined spending limit, and the account holder is queried whether or not to increase the ancillary cardholder's spending limit and by how much.

To achieve the above objective, the present invention provides a system and method for approval or refusal of a transaction by an ancillary transaction cardholder, and for contacting and informing the account holder that the spending limit of the ancillary cardholder has been reached, and requesting of the cardholder whether the spending limit of the ancillary cardholder should be increased and by what amount.

In a preferred embodiment, a system is provided for authorizing monetary transactions for the procurement of goods, services or distribution of currency using a credit or debit transaction card while allowing the account holder to control spending by someone using an ancillary transaction card, that is, a transaction card issued for use generally by someone other than the account holder and may be subject to restrictions determined by the account holder. Transactions using the ancillary card are generally attributed and billed to the account holder's account. The account holder may be, for example, a parent, and the user of the ancillary transaction card may be, for example, a child. The parent can set a spending limit, and request to be notified if the limit is exceeded in order to increase the spending amount or refuse the transaction.

A child is issued an ancillary transaction card from a card issuer, the transaction card having a card number and an account number, such that when the child uses the issued card to procure goods or services from a merchant, approval for the transaction is sought by the merchant. The merchant contacts a central computer by way of a special telephone number printed on the card, the central computer having a first database of card issuers, selects the issuer of the transaction card being used by the child, and contacts that issuer computer, which has:

1. a second database of spending limits pre-approved by a parent,
2. a third database of spending limits pre-approved by the card issuer for the parent's account, and
3. a fourth database of a contact method for contacting the parent.

The central computer retrieves authorization of the transaction from the first issuer computer based on the pre-approved limit established for the ancillary transaction card used by the child or refusal of the transaction based on the pre-approved limit set by the parent for the child. A method for contacting the parent is sent to the central computer when a refusal code is transmitted, the central computer having the ability to contact the parent for parental approval or refusal of the transaction if the transaction exceeds the preset spending amount for the child. The central computer contacts the parent by way of two-way communications, e.g., cellular phone, two-way pager, or other personal communication service, and queries the parent if the card issuer should deny or approve the transaction based on the pre-approved parental spending limit. The parent communicates via the two-way communication device with the central computer, authorizing or refusing an increased spending limit if requested. The central computer passes appropriate approval or refusal codes for the transaction to the merchant. In this manner, if the child exceeds the parental pre-approved spending limit, the parent can be quickly contacted by the central computer and queried whether to approve or refuse an increase in the child's spending limit, followed by transmission of an approval/refusal code to the merchant for the in-progress transaction.

The two-way communications between the central computer and the account holder/parent may be performed using a two-way paging device, where the central computer: 1. notifies the parent of a pending transaction, including the amount of spending excess above the pre-approved spending limit and identification of the ancillary cardholder, and 2. queries the parent for approval or refusal for the pending transaction. Additional information may be transmitted to the parent, for example, the location of the pending transaction, what is being purchased, or the name of the merchant.

In another embodiment of the present invention, the database containing parental controlled spending limits on ancillary transaction cards is accessed and controlled by the central computer. The central computer may or may not be the card issuer. When the central computer is not the issuer computer, the central computer requests approval/refusal from the issuer computer based on the account status only. All comparisons of the transaction to the ancillary cardholder limits are performed by the central computer.

Still other objects and advantages of the present invention will become readily apparent to those skilled in the art from the following detailed description, where we have shown and described only the preferred embodiments of the invention, simply by way of illustration of the best mode contemplated by us of carrying out our invention. As will be realized, the invention is capable of other and different embodiments, and its several details are capable of modifications in various respects, all without departing from the invention. Accordingly, the drawings and descriptions are to be regarded as illustrative in nature, and not as restrictive.

DETAILED DESCRIPTION OF PREFERRED EMBODIMENTS

Figure 1:
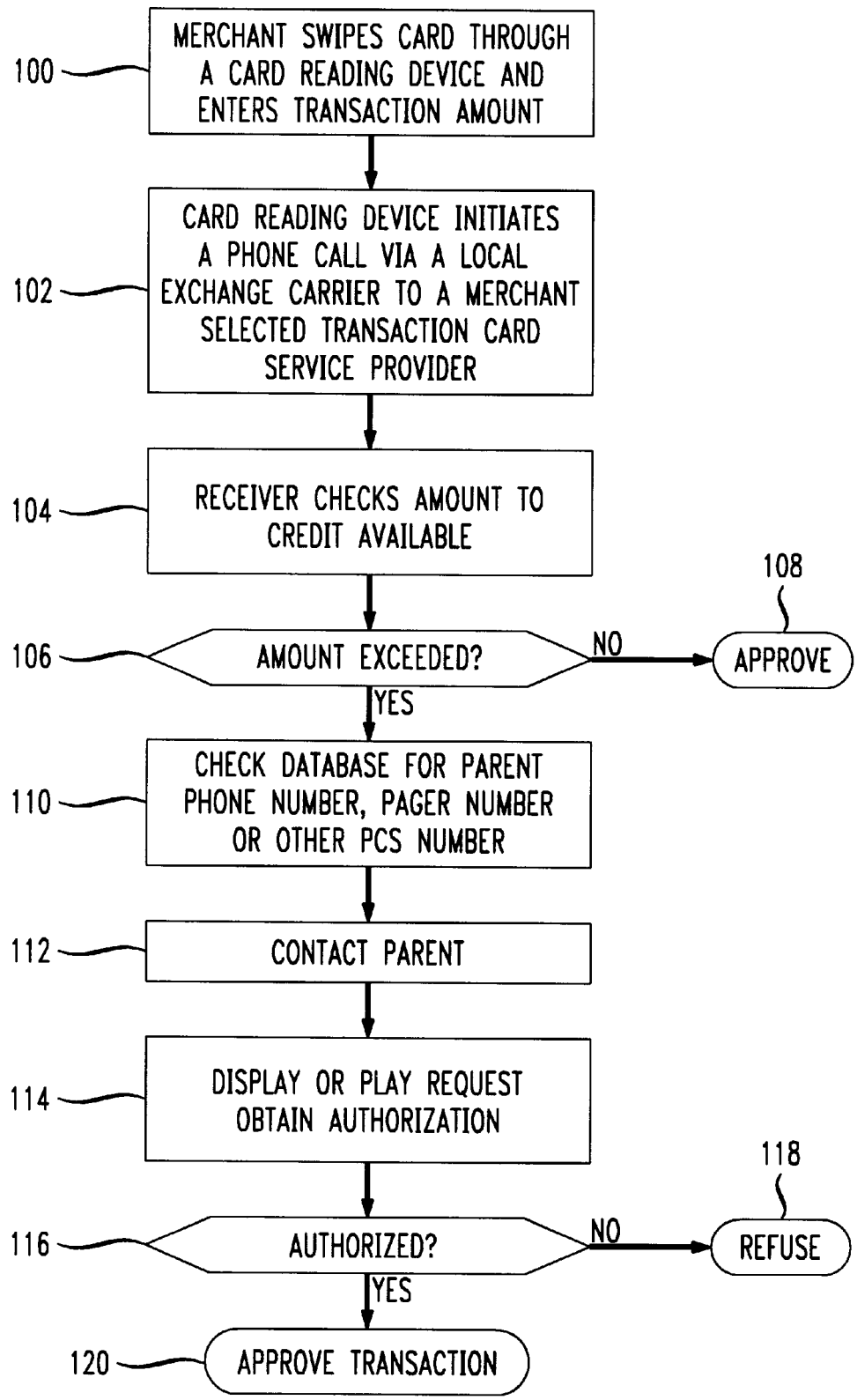
FIG. 1 is a flow chart illustrating the authorization procedure according to the present invention.

The present invention is directed to a unique system and method for controlling spending limits of card users holding ancillary credit or debit type transaction cards. A transaction card account holder may authorize the issuance of an ancillary transaction card to a card user. The account holder, who is the responsible person for the account, may also set a spending limit on the ancillary card, thereby restricting the spending power of the ancillary card user. The account holder may be a parent, and the card user may be a child. FIG. 1 is a flow chart illustrating the steps generally taken in this invention when an ancillary card is used for the procurement of goods, services or distribution of currency.

Initially, the user of an ancillary transaction card selects merchandise to procure and presents the transaction card to the merchant for payment. The merchant takes the transaction card and swipes the transaction card through a card reading device and enters the transaction amount as indicated in step 100. When the merchant swipes the transaction card through the card reading device, the card reading device is activated and initiates contact with a remote transaction card service provider at step 102. The card reader is of the type known in the art to scan the card information from an information storage media affixed to the card, e.g. magnetic strip, and initiates a phone call via a local exchange carrier to a transaction card service provider. The remote transaction service provider receives the transaction card information and transaction amount as entered by the merchant at step 100 and proceeds to retrieve account information related to the transaction card at step 104. The remote transaction service provider, also known as the central computer, determines at step 106 whether the transaction amount as entered by the merchant at step 100 exceeds the available credit for this ancillary card at step 106. If the ancillary card transaction amount has not exceeded the predetermined account holder limit, the transaction is approved and an approval code transmitted to the merchant at step 108. If the ancillary card transaction amount exceeds the predetermined account holder spending limit, the central computer retrieves from the database a phone number, pager number or other personal communications number for the account holder at step 110. In step 112, the central computer initiates contact with the account holder. When contact with the account holder is established, the central computer transmits display or voice request informing the account holder that an ancillary card is being used for a transaction, and that the transaction has exceeded the predetermined spending limit according to step 114. Additional information may be included, for example, the location of the pending transaction, what is being purchased, or the name of the merchant. The central computer requests approval/refusal from the account holder for the requested transaction. If the account holder approves the increased transaction amount at step 116, the remote transaction service provider central computer transmits an approval code for the transaction to the merchant at step 120. If the account holder does not approve the transaction at step 116, the remote transaction service provider central computer will transmit a refusal code to the merchant denying completion of the transaction at step 118.

The method of communication between the central computer and the account holder may be by cellular telephone, two-way pager, or other personal communications device. In order for this invention to function properly, the central computer must query the parent in a manner appropriate to the communications device selected. For example, if a two-way pager is used, a series of yes/no, approve/refuse, or other dichotomies may be offered to the parent for ease of selection. Similarly, because we are dealing with a computer communicating with a human, when a cell phone or other voice communication is initiated by the central computer, parental response may be in the form of voice command, for example, yes/no, approve/refuse, etc., or a tone response using the alphanumeric keys on the phone. In the case of a personal communications device having a keyboard, more detailed responses may be requested by the central computer, for example, increase of the spending limit by some amount.

Figure 2:
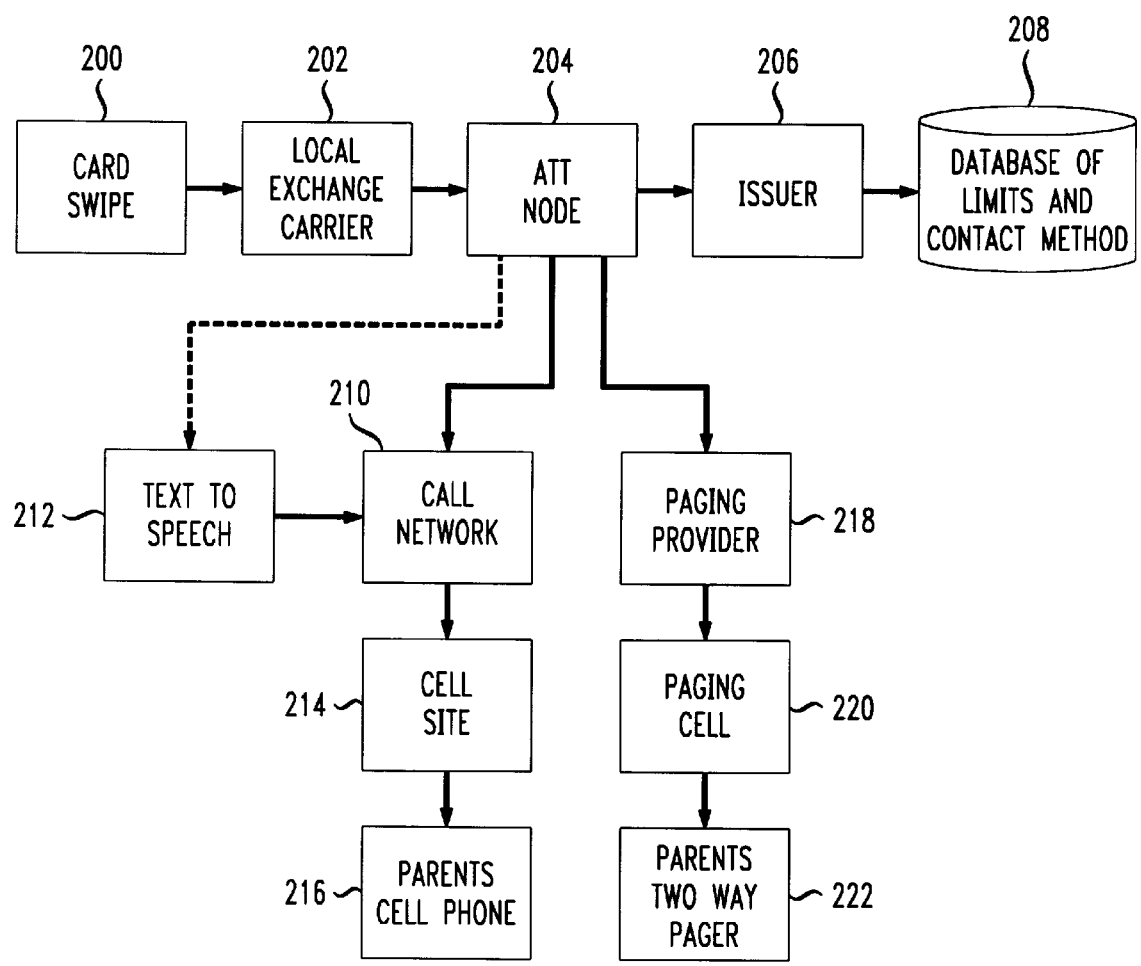
FIG. 2 is an illustration of a network according to the present invention.

In FIG. 2, a network according to the present invention is described. The transaction card is initially swiped at a merchant's location using a card reading device 200. The transaction and reader, described above, initiates a phone call via a local exchange carrier 202, using a phone number taken from the transaction card. When the phone call is connected, the transaction card reader initializes communication with a remote transaction service provider, for example an AT&T node 204. The AT&T node 204 first validates the transaction card. This includes checking with the actual card issuer 206 to make sure the proposed procurement would not exceed predetermined spending limits. The card issuer accesses a database 208 containing spending limitations and account holder contact methods to verify if the procurement exceeds the predetermined limit of the account holder's account, as well as the predetermined limit of any ancillary card in use. If the proposed procurement is below the ancillary card limit found in the database 208, an authorization code is transmitted from the issuer 206 to the AT&T node 204. In the event that the proposed procurement would bring the balance of the card between the two limits, that is, between the maximum limit of the account holder's account and the spending limit predetermined for the ancillary card, the system uses the AT&T network to find the account holder using the account holder contact method and ask permission for the ancillary cardholder to have the necessary credit limit to complete the transaction.

This query could be done via mobility number and recorded message, for example, press 1 to allow . . . , or two-way pager query. If the contact method in database 208 is a cellular telephone, the AT&T node 204 initiates a cellular telephone call. The AT&T node 204 initiates, by way of a data signal to a call network 210, a cellular telephone call to the parent previously identified as the contact person. This call network 210 is associated with a text to speech converter 212 in order to send a voice message to the account holder. Alternatively, the text to speech converter 212 may be directly associated with the AT&T node 204, and the call network 210 following the text to speech converter 212. The call network 210 generates a voice connection with a cell site 214 relaying a phone call to the account holder's cellular telephone 216. The voice message sent to the account holder may take the form of a recorded message informing the account holder that a transaction amount of an ancillary card holder has been exceeded, and requesting the account holder to press 1 to allow the transaction to occur, press 2 to refuse an increase in credit, etc. The account holder, upon hearing the message from the central computer, responds appropriately.

Alternatively, if the contact method identified by database 208 is a two-way paging method, the AT&T node 204, that is, the central computer, may initiate a data signal to a paging provider 218 which forwards the data signal and message to paging cell 200 for transmission and receipt by the account holder's two-way pager 222. The message sent by the AT&T node 204 to the account holder's two-way pager 222 may be a short message alerting the account holder that an ancillary card holder has exceeded a transaction card procurement limit, and to press a button on the pager to approve or refuse the transaction, or to increase or sustain the present procurement limitations, etc.

Upon receipt at the AT&T node 204 of an approval of the proposed procurement transaction by the account holder, the approval code previously received from the card issuer 206 is transmitted to the merchant via normal communications means. If the message received from the account holder at the AT&T node 204 is refusal, a refusal code is transmitted to the merchant via the normal communications means.

In the eyes of a merchant, the only difference between the credit card authorizations presently in use and the present invention is the phone number which the merchant uses to retrieve credit card authorization. That is, the merchant will use a number preprinted on the ancillary transaction card in order to retrieve approval of the transaction.

Figure 3:
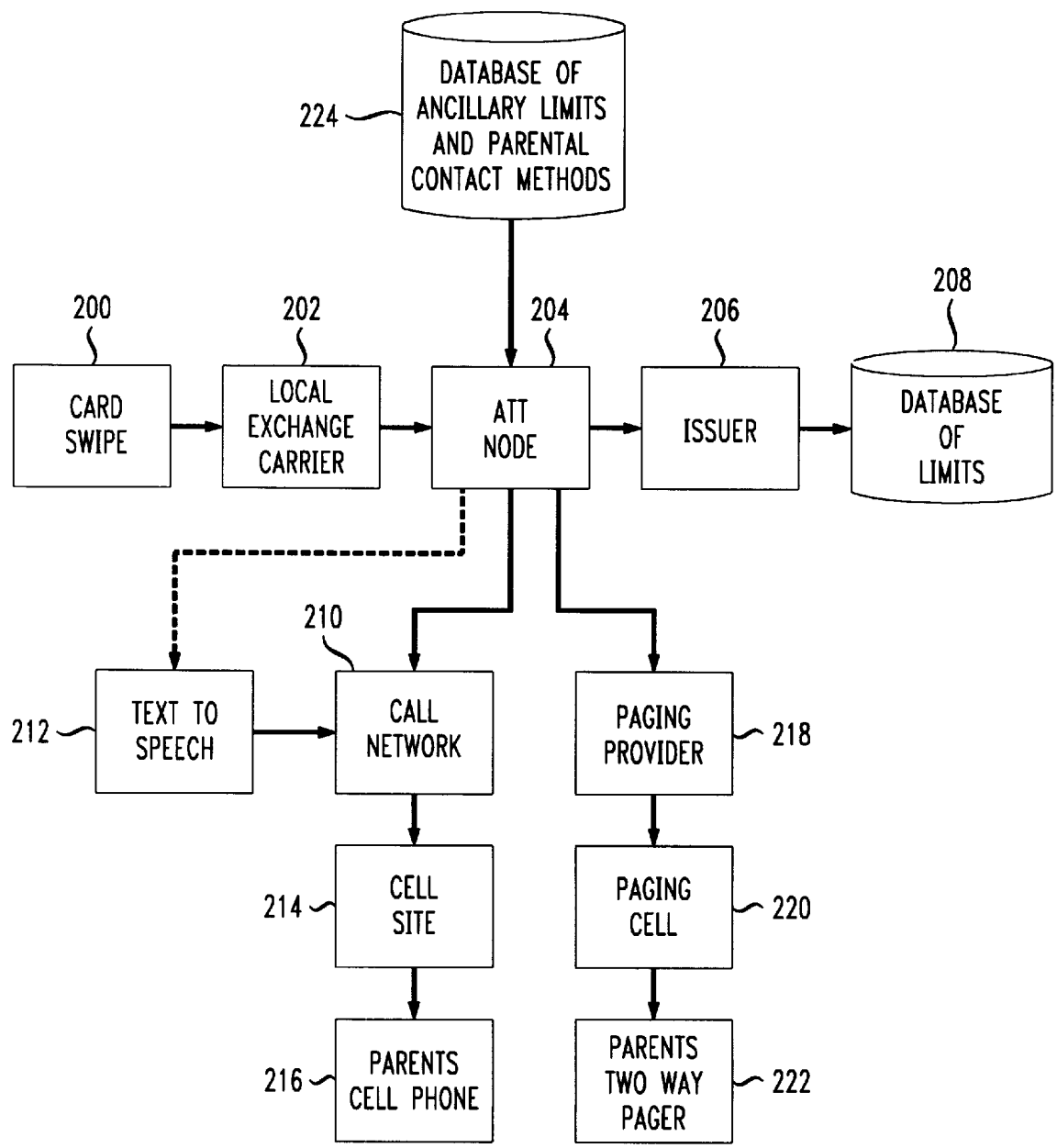
FIG. 3 is an illustration of a network according to a second embodiment of the present invention.

In a second embodiment, shown in FIG. 3, the AT&T node 204 maintains a database of pre-approved transaction limits for ancillary cards of an account. When the AT&T node 204 contacts the card issuer for approval, the card issuer 206 determines from database 208 only whether the transaction exceeds the spending limit of the account. The AT&T node 204 maintains in a separate database 224 the ancillary card limits and the contact methods for communicating with the account holder. Thus, approval of a procurement transaction using an ancillary transaction card is determined by the AT&T node computer 204, where a decision is made that if the transaction is less than the pre-approved limitation, the AT&T node 204 transmits the issuer's approval code directly to the merchant. If the AT&T node 204 detects that the transaction exceeds the pre-approved limitation of the ancillary card, the AT&T node 204 initiates contact with the account holder using the contact method stored within its database.

Alternative communications methods may be used to contact the account holder for approval refusal of a pending transaction. For example, electronic messaging via personal communications device may be accomplished using e-mail or other digital or analog communications means, so long as the account holder receives information about the pending procurement transaction and has the ability to approve or refuse a pending transaction in a timely manner.

As will be understood by those familiar in the art, the present invention may be embodied in other specific forms without departing from the spirit or essential characteristics thereof. For example, different communications methods may be used, different approval methods may be used, or different forms of the network and relational databases may be used. Also, the separate databases may be combined and located on a single machine, the databases may be accessed by the central computer or the issue computer, and the central computer and the issuer computer could be the same computer or network. Although certain preferred embodiments have been shown and described, it should be understood that many changes and modifications may be made therein without departing from the scope of the appended claims.

What is claimed is:

1. A system for authorizing monetary transactions for the procurement of goods, services or distribution of currency using a credit or debit type transaction card while allowing an account holder to control spending by a card user using the transaction card by permitting the account holder to approve or refuse a spending amount exceeding a predetermined value, said system comprising:

a card issued to a card user from a card issuer having a card number, the card number including an account number;

wherein when the card user uses the issued card to procure goods or services from a merchant via a card transaction, the merchant seeks approval from the card issuer of the transaction;

a central computer having a first database of card issuers;

a first issuer computer having a second database of spending limits pre-approved by the account holder, a third database of spending limits pre-approved by the card issuer, and a fourth database of a contact method for contacting the account holder;

wherein said central computer retrieves approval or refusal of the transaction from the first issuer computer, and wherein the refusal of a transaction is accompanied by the method for contacting the account holder;

central computer contact means for contacting said account holder for approval or refusal of an increase in the procurement limit of the card user's card for the transaction;

and wherein the central computer passes the account holder's approval or refusal of the pending transaction to the merchant.

2. The system for authorizing monetary transactions for the procurement of goods, services or distribution of currency using a credit or debit type transaction card while allowing an account holder to control spending by a card user according to claim 1, wherein the means for contacting the account holder is a call placed by the central computer to an account holder's cellular telephone.

3. The system for authorizing monetary transactions for the procurement of goods, services or distribution of currency using a credit or debit type transaction card while allowing an account holder to control spending by a card user according to claim 1, wherein the means for contacting the account holder is a call placed by the central computer to an account holder's 2-way paging device.

4. The system for authorizing monetary transactions for the procurement of goods, services or distribution of currency using a credit or debit type transaction card while allowing an account holder to control spending by a card user according to claim 1, wherein the means for contacting the account holder is a communication established by the central computer to an account holder's 2-way personal communications device.

5. The system for authorizing monetary transactions for the procurement of goods, services or distribution of currency using a credit or debit type transaction card while allowing an account holder to control spending by a card user according to claim 1, wherein approval of the transaction by the account holder is an approval of an amount greater than the card user's pre-approved spending limit.

6. The system for authorizing monetary transactions for the procurement of goods, services or distribution of currency using a credit or debit type transaction card while allowing an account holder to control spending by a card user according to claim 1, wherein said central computer contacting means transmits transaction information to said account holder, said transaction information including any of the following: what is being purchased, where the transaction is occurring, the identity of the merchant requesting the approval, and the name of the card user.

7. The system for authorizing monetary transactions for the procurement of goods, services or distribution of currency using a credit or debit type transaction card while allowing an account holder to control spending by a card user according to claim 1, wherein the first, second, third and fourth databases are components of a single database.

8. The system for authorizing monetary transactions for the procurement of goods, services or distribution of currency using a credit or debit type transaction card while allowing an account holder to control spending by a card user according to claim 1, wherein each of the first, second, third and fourth databases are accessible by the central computer or the issuer computer.

9. The system for authorizing monetary transactions for the procurement of goods, services or distribution of currency using a credit or debit type transaction card while allowing an account holder to control spending by a card user according to claim 1, wherein the central computer and the issuer computer are components of either a single computer or a computer network.

10. A method for authorizing monetary transactions for the procurement of goods, services or distribution of currency using a credit or debit type transaction card while allowing an account holder to control spending by a card user, comprising the steps of:

a) a merchant communicating a card number, account number and transaction information to a central computer;

b) the central computer checks the transaction information and approves the transaction if the amount of the transaction is less than a pre-approved spending limit imposed by said account holder;

c) if the transaction amount is greater than the pre-approved spending limit imposed by said account holder, the central computer initiates communications with said account holder;

d) contacting said account holder using a 2-way communications device and notifying the account holder of the transaction information and amount and asking the account holder for approval or refusal of the transaction, said account holder transmitting transaction approval or refusal to the central computer;

e) if the account holder approved the transaction, the central computer transmits an approval code to the merchant; and f) if the account holder refuses the transaction, the central computer transmits a refusal code to the merchant.

11. The method for authorizing monetary transactions for the procurement of goods, services or distribution of currency using a credit or debit type transaction card while allowing an account holder to control spending by a card user according to claim 10, wherein the central computer retrieves the spending approval code and refusal code from an issuer computer.

12. A method for authorizing monetary transactions for the procurement of goods, services or distribution of currency using a credit or debit type transaction card while allowing an account holder to control spending by a card user using the credit or debit type transaction card by requiring the account holder to authorize a spending amount exceeding a predetermined value comprising the following steps:

a merchant enters a card number from the credit or debit type transaction card and a transaction amount into a communications device which transmits the card number and transaction amount to a central computer;

a central computer comprising a database having a first field for the card number and a second field for a parent controlled spending limit receives the merchant transmitted card number and transaction amount information and retransmits this information to an issuer computer;

the issuer computer, having a second database of spending limits pre-approved by the account holder, a third database of spending limits pre-approved by the card issuer, and a fourth database of a contact method for contacting the account holder receives the card number and transaction information and compares the received information to the database limits, resulting in one of the following:

1) if the received transaction amount is below the pre-approved spending limit, the issuer computer transmits an approval code to the central computer, or 2) if the received transaction amount is greater than the pre-approved spending limit for the ancillary card and less than the pre-approved spending limit for the account holder, the issuer computer transmits an approval code and account holder notification information to the central computer, or 3) if the received transaction amount is greater than the pre-approved spending limit for the account holder account, the issuer computer transmits a transaction refusal code to the central computer;

the central computer receives the transaction approval or transaction refusal from the issuer computer and either 1) forwards the approval code to the merchant if the transaction amount is below the pre-approved account holder limit, or 2) forwards the refusal code to the merchant if the transaction amount is greater than the pre-approved account holder's account limit, or 3) contacts the account holder using two-way communications devices, informing the account holder that the spending limit for the card user has been reached and asking the account holder whether the card user's spending limit can be increased and to what level; and if the account holder chooses to increase the spending limit, the central computer transmits the transaction approval code to the merchant, however, if the card holder refuses an increased amount for the transaction, the central computer transmits a refusal code to the merchant.

13. The method for authorizing monetary transactions for the procurement of goods, services or distribution of currency using a credit or debit type transaction card while allowing an account holder to control spending by a card user according to claim 12, wherein when said central computer contacts said account holder, said central computer transmits transaction information to said account holder.

14. The method for authorizing monetary transactions for the procurement of goods, services or distribution of currency using a credit or debit type transaction card while allowing an account holder to control spending by a card user according to claim 12, wherein the first, second, third and fourth databases are components of a single database.

15. The method for authorizing monetary transactions for the procurement of goods, services or distribution of currency using a credit or debit type transaction card while allowing an account holder to control spending by a card user according to claim 12, wherein each of the first, second, third and fourth databases are accessible by the central computer or the issuer computer.

16. The method for authorizing monetary transactions for the procurement of goods, services or distribution of currency using a credit or debit type transaction card while allowing an account holder to control spending by a card user according to claim 12, wherein the central computer and the issuer computer are components of either a single computer or a computer network.

17. A system for authorizing monetary transactions for the procurement of goods, services or distribution of currency using a credit or debit type transaction card while allowing an account holder to control spending by a card user using the transaction card by permitting the account holder to approve or refuse a spending amount exceeding a predetermined value, the system comprising:

a card issued to a card user from a card issuer having a card number, the card number including an account number;

wherein when the card user uses the issued card to procure goods or services from a merchant via a card transaction, the merchant seeks approval from the card issuer of the transaction;

a central computer having a first database of card issuers, a second database of spending limits pre-approved by the account holder, and a third database of a contact method for contacting the account holder;

a first issuer computer having a fourth database of account spending limits pre-approved by the card issuer;

wherein said central computer retrieves approval or refusal of the transaction from the first issuer computer;

central computer contact means for contacting said account holder for approval or denial of the transaction;

and wherein the first central computer passes the account holder approval or refusal of the transaction to the merchant.

18. The system for authorizing monetary transactions for the procurement of goods, services or distribution of currency using a credit or debit type transaction card while allowing an account holder to control spending by a card user according to claim 17, wherein the means for contacting the account holder is a call placed by the central computer to an account holder's cellular telephone.

19. The system for authorizing monetary transactions for the procurement of goods, services or distribution of currency using a credit or debit type transaction card while allowing an account holder to control spending by a card user according to claim 17, wherein the means for contacting the account holder is a call placed by the central computer to an account holder 2-way paging device.

20. The system for authorizing monetary transactions for the procurement of goods, services or distribution of currency using a credit or debit type transaction card while allowing an account holder to control spending by a card user according to claim 17, wherein for contacting the account holder is a communication initiated by the central computer to an account holder 2-way personal communications device.

21. The system for authorizing monetary transactions for the procurement of goods, services or distribution of currency using a credit or debit type transaction card while allowing an account holder to control spending by a card user according to claim 17, wherein approval of the transaction by the account holder is an approval of an amount greater than the pre-approved spending limit.

* * * * *